United States Patent [19]

Coenen et al.

[11] Patent Number: 4,532,992

[45] Date of Patent: * Aug. 6, 1985

[54] METHOD FOR RECOVERING PETROLEUM

[75] Inventors: Hubert Coenen; Ernst Kriegel, both of Essen, Fed. Rep. of Germany

[73] Assignee: FRIED. KRUPP Gesellschaft mit beschränkter Haftung, Essen, Fed. Rep. of Germany

[ * ] Notice: The portion of the term of this patent subsequent to May 8, 2001 has been disclaimed.

[21] Appl. No.: 406,052

[22] Filed: Aug. 6, 1982

[30] Foreign Application Priority Data

Aug. 19, 1981 [DE] Fed. Rep. of Germany ....... 3132755

[51] Int. Cl.$^3$ ............................................. E21B 43/24
[52] U.S. Cl. .................................. 166/267; 166/261; 166/272; 166/303
[58] Field of Search ............... 166/261, 266, 267, 268, 166/272, 303, 305 R

[56] References Cited

U.S. PATENT DOCUMENTS

| T700,489 | 4/1969 | Long et al. | 208/11 |
|---|---|---|---|
| 3,351,132 | 11/1967 | Dougan et al. | 166/11 |
| 3,381,523 | 5/1968 | Nettles | 166/305 R |
| 3,842,910 | 10/1974 | Zingg et al. | 166/305 R |
| 3,969,196 | 7/1976 | Zosel | 203/49 |
| 4,048,078 | 9/1977 | Allen | 166/272 |
| 4,108,760 | 8/1978 | Williams et al. | 208/11 LE |
| 4,212,354 | 7/1980 | Guinn | 166/303 |
| 4,384,614 | 5/1983 | Justheim | 166/272 |
| 4,446,921 | 5/1984 | Coenen et al. | 166/267 |

FOREIGN PATENT DOCUMENTS

| 819386 | 10/1951 | Fed. Rep. of Germany . |
|---|---|---|
| 1245290 | 7/1967 | Fed. Rep. of Germany . |
| 1916748 | 4/1969 | Fed. Rep. of Germany ...... 166/267 |
| 2335896 | 2/1974 | Fed. Rep. of Germany . |

Primary Examiner—Stephen J. Novosad
Assistant Examiner—William P. Neuder
Attorney, Agent, or Firm—Spencer & Frank

[57] ABSTRACT

A process for recovering petroleum from deposits which have already been worked by primary extraction or are not suited for primary extraction. A gas in its supercritical state is introduced into the deposit. The supercritical gas charges itself with the petroleum while flowing through the deposit. The charged supercritical gas leaves the deposit and the petroleum is separated in a plurality of fractions from the charged supercritical gas.

4 Claims, No Drawings

METHOD FOR RECOVERING PETROLEUM

BACKGROUND OF THE INVENTION

The present invention relates to a method for recovering petroleum from deposits which have already been worked by primary extraction or are not suitable for primary extraction.

Petroleum deposits comprise reservoir rock formations which are covered on top by impermeable layers. The oil is contained in the reservoir rock formations and different binding forces act between the oil and the rock. Petroleum is recovered from minable deposits by primary extraction processes. Particularly important primary extraction processes are the deep well extraction process and the gas lift extraction process.

Only about one-third of the petroleum quantities existing in the deposits can be recovered by the primary extraction. When the oil yield decreases in primary extraction, so-called secondary or tertiary extraction processes are used to increase the degree of oil removed from the deposit. The secondary or tertiary extraction processes are also used in deposits which, for economic reasons, cannot be worked with primary extraction methods (e.g. tar sands).

The secondary extraction processes can be divided into three groups. The first group comprises processes which influence the pore content of the reservoir rock formations by introducing foreign energy. Exemplary of such processes are the gas injection process and the vacuum process. The second group comprises processes which increase the surface area of the pore system of the reservoir rock. Exemplary processes of the second group include processes which employ acidification and those which employ hydraulic crack formation. The third group comprises processes which change the physical forces between pore content and pore wall in the reservoir rock. Exemplary processes of the third group are those which employ surface active substances, bacterial activity, or heat.

German Auslegeschrift DE-AS No. 1,493,190 discloses a method for separating mixtures of organic substances by treating the mixtures of organic substances with supercritical gas and subsequently separating the substances dissolved in the resulting supercritical gas phase by reduction of pressure and/or increase in temperature. This publication does not contain any disclosure relating to recovering petroleum from deposits which have already been worked by primary extraction or are not suitable for primary extraction by using supercritical gases.

SUMMARY OF THE PRESENT INVENTION

It is an object of the present invention to provide an oil recovery process which permits working of deposits which are not suitable for primary extraction or which have already been worked by primary extraction.

A further object of the present invention is to provide such a process which assures, in particular, a high degree of oil removal from the deposits with low susceptibility to malfunction and improved economy.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a method for recovering petroleum from a deposit which has already been worked by primary extraction or is not suitable for primary extraction, comprising: introducing a gas in its supercritical state through a bore hole into the deposit to charge the supercritical gas with petroleum and form a charged supercritical gas phase while the supercritical gas flows through the deposit, removing the charged supercritical gas phase from the deposit through a bore hole, and separating the petroleum from the charged supercritical gas phase in a plurality of fractions by stepwise pressure reduction and/or a change in temperature.

It is to be understood that both the foregoing general description and the following detailed description are exemplary, but are not restrictive of the invention.

DETAILED DESCRIPTION OF THE PRESENT INVENTION

The process of the present invention for recovering petroleum from a deposit which has already been worked by primary extraction or is not suitable for primary extraction comprises introducing a gas which is in the supercritical state through a bore hole into the deposit to charge the supercritical gas with petroleum and thereby form a charged supercritical gas phase while the gas flows through the deposit. The charged supercritical gas phase leaves the deposit through a bore hole, and the petroleum is separated from the charged supercritical gas phase in a plurality of fractions by pressure reduction and/or a change in temperature.

The process of the present invention presents numerous and unexpected advantages. Although the above referred to DE-AS No. 1,493,190 discloses a process for separating mixtures of organic substances by treating the mixtures with supercritical gas and subsequently separating the substances dissolved in the supercritical gas phase by pressure reduction and/or temperature increases, it could not be expected that the recovery of petroleum could be effected in an advantageous manner by means of supercritical gases. For example, it has been found unexpectedly that the supercritical gas favorably influences the pore structure of the reservoir rock, thus enabling the oil to better exit from the reservoir rock and to be better removed by the supercritical gas phase.

Moreover, it has been found unexpectedly that the charged supercritical gas phase has a viscosity which has a particularly advantageous effect on the pumpability of the charged supercritical gas phase. Finally, in view of the known processes of primary and secondary extraction, it has been found especially surprising that the oil can be separated from the supercritical gas phase in a plurality of fractions in a simple and advantageous manner.

In the process according to the present invention, oil recovery and oil processing are combined with one another to provide an integrated process which results in a surprisingly successful operation with respect to both engineering and economy.

The process according to the present invention cannot be used for deposits which consist of particularly porous rock since the supercritical gas extraction agent would exit from this rock in an uncontrollable manner. The process of the present invention preferably is used for deposits which are sufficiently non-porous to enable the charged supercritical gas phase to be recovered almost completely from the deposit. Approximately 8 to 10 kg of supercritical gas generally are required to extract one liter of crude oil according to the process of the present invention.

The process according to the present invention can be used with particular success if the gas in the supercritical state enters the deposit at a temperature of 10° to 100° C. above its critical temperature and with a pressure of 2 to 350 bar above its critical pressure. The use of these conditions for the state of the supercritical gas assures that the gas, on the other hand, retains its supercritical state while in the deposit and, on the other hand, assures that the gas can be introduced into the deposit with a consumption of energy that is economically justifiable.

Preferably, in the practice of the process according to the present invention, the temperature of the supercritical gas on its path of extraction drops to such an extent that, upon leaving the deposit, it has a temperature which is 5° to 25° C. above its critical temperature. The temperature drop must be controlled by measuring the inlet and exit temperature of the supercritical gas. This measure assures that the supercritical gas, on its extraction path, continuously charges itself with an increasing quantity of oil, since the dissolving or solution capability of supercritical gases generally is at an optimum in a temperature range which is slightly above the critical temperature and decreases with increasing temperature. Further, by providing a temperature gradient for the supercritical gas as just described, that is, by having the temperature of the supercritical gas drop during its passage through the deposit, it is assured that the extracted oil in the supercritical gas phase will not precipitate or drop out of the supercritical gas phase before the supercritical gas phase leaves the deposit.

Preferably, in the practice of the present invention, the entering temperature of the supercritical gas into the deposit is lowered by 2° to 50° C. during the course of the extraction process. Thus, as the extraction process progresses, the temperature at which the supercritical gas is fed into the deposit is lowered in stages or continuously. By lowering the entering temperature of the supercritical gas, the extraction capability of the supercritical gas is continuously increased during the working of the deposit, and any reduction in the extraction rate caused by the decrease in the quantity of the oil available for extraction as a result of the extractive working on the deposit, can be compensated by the increase in the dissolving capability of the supercritical gas. Due to the fact that the temperature of the supercritical gas when it enters into the deposit, is lowered by passage of the gas through the deposit during the entire extraction period and that the exit temperature of the supercritical gas, when it leaves the deposit, preferably is only slightly above (e.g. 5° to 25° C. above) the critical temperature of the gas, the zone within which the supercritical gas has its maximum extraction effect advantageously travels in a direction opposite to the direction of the flow of the supercritical gas.

The process according to the present invention can be used with particular success if the gas is carbon dioxide, ethane, ethene, propane or a mixture thereof. These gases in their supercritical state have a good dissolving capability for petroleum and can be obtained in sufficient quantities from natural deposits. Carbon dioxide has the additonal advantage that it can be used without costly safety measures. Moreover, $CO_2$ has a critical pressure of $P_{crit}=73.9$ bar and a critical temperature of $T_{crit}=31°$ C., which makes it particularly suited for use in underground deposits, inasmuch as many of these underground deposits have a temperature which is above the critical temperature of $CO_2$. Preferably, when carbon dioxide is used as the supercritical gas in order to recover oil according to the method of the present invention, it is introduced into the deposit through one or a plurality of bore holes at a temperature of about 50° C. and under pressure of about 300 bar.

In accordance with the present invention, the petroleum is separated from the supercritical gas phase in a plurality of fractions. Such a separation is particularly advantageous for further processing of the separated components. The fractionated separation of the oil from the supercritical gas phase generally occurs above ground after the supercritical gas has left the deposit through a bore hole which is spaced from the bore hole through which the gas entered the deposit. The fractionated separation of the petroleum oil from the supercritical gas phase can be effected solely by stepwise pressure reduction of the charged supercritical gas phase, or solely by stepwise changes in temperature (increase in temperature or reduction in temperature) of the charged supercritical gas, or simultaneously effecting a stepwise pressure reduction and change in temperature (temperature increase or temperature reduction) of the charged supercritical gas.

The separation from the charged supercritical gas phase is performed in at least two stages to obtain at least two fractions of the extracted petroleum oil. This separation can be achieved by passing the charged supercritical gas phase in succession through fractionating devices. During the separation, the compounds having a high molecular weight are precipitated first from the supercritical gas phase, and then the compounds having a lower molecular weight are precipitated. If the separation of the oil is effected by an increase in temperature, care must be taken that temperatures are avoided at which individual petroleum components are cracked.

The gases used in the petroleum recovery according to the present invention can be used again, after the petroleum has been separated, by reintroducing the gas into the deposit. Thus, the gas from which the petroleum has been separated can be compressed in a pump to the supercritical pressure required to extract petroleum from the deposit, and thereafter heated to the required supercritical temperature in a heat exchanger. It can then be conveyed in its supercritical state into the deposit through a bore hole. Since a certain quantity of the supercritical gas is lost during the extraction, new gas can be continuously added from a reservoir tank to the circulation.

It will be understood that the above description of the present invention is susceptible to various modifications, changes and adaptations, and the same are intended to be comprehended with the meaning and range of equivalents of the appended claims.

What is claimed is:

1. Method for recovering petroleum from a deposit which has already been worked by primary extraction or is not suitable for primary extraction by extraction with a supercritical gas, comprising: introducing a gas in its supercritical state at a temperature which lies 10° to 100° C. above the critical temperature of the gas and at a pressure which lies 2 to 350 bar above the critical pressure of the gas through a bore hole into the deposit, wherein the supercritical gas becomes charged with petroleum to form a charged supercritical gas phase while the supercritical gas flows through the deposit; removing the charged supercritical gas phase from the deposit through a bore hole; and separating the petroleum from the charged supercritical gas into at least two separate fractions by stepwise pressure reduction and/or a change in temperature, characterized by introducing 8 to 10 kg of supercritical gas per liter of petroleum recovered.

2. Process as defined in claim 1, wherein the temperature of the supercritical gas decreases on its extraction path to such an extent that, when the gas leaves the deposit, the gas has a temperature which is 5° to 25° C. above its critical temperature.

3. Method as defined in claim 1 or 2, wherein the entrance temperature of the supercritical gas into the deposit is lowered by 2° to 50° C. during the extraction process.

4. Method as defined in claim 1 or 2, wherein the gas is carbon dioxide, ethane, ethene, propane, or a mixture of these gases.

* * * * *